United States Patent
Lu et al.

(10) Patent No.: US 10,626,868 B2
(45) Date of Patent: Apr. 21, 2020

(54) OIL-INJECTED SCREW AIR COMPRESSOR

(71) Applicants: ALMiG Kompressoren GmbH, Köngen (DE); FUSHENG INDUSTRIAL (SHANGHAI) CO., LTD., Shanghai (CN)

(72) Inventors: Ming-Te Lu, New Taipei (TW); Viktor Weber, Kenzingen (DE); Sheng-Kun Chen, Shanghai (CN); Feng-Yung Lin, New Taipei (TW)

(73) Assignees: ALMIG KOMPRESSOREN GMBH, Köngen (DE); FUSHENG INDUSTRIAL (SHANGHAI) CO., LTD, Shanghai (CN)

(*) Notice: Subject to any disclaimer, the term of this patent is extended or adjusted under 35 U.S.C. 154(b) by 389 days.

(21) Appl. No.: 15/630,964

(22) Filed: Jun. 23, 2017

(65) Prior Publication Data
US 2018/0119600 A1     May 3, 2018

(30) Foreign Application Priority Data
Oct. 28, 2016 (EP) .................................. 16196232

(51) Int. Cl.
*F04C 29/00* (2006.01)
*F04C 23/00* (2006.01)
*F04C 29/02* (2006.01)

(52) U.S. Cl.
CPC ........ *F04C 29/0014* (2013.01); *F04C 23/001* (2013.01); *F04C 29/0092* (2013.01);
(Continued)

(58) Field of Classification Search
CPC .............. F04C 29/0007; F04C 29/0014; F04C 15/0088; F04C 15/0092; F04C 29/02;
(Continued)

(56) References Cited

U.S. PATENT DOCUMENTS 5,386,873 A * 2/1995 Harden, III ............ B60K 11/04
                                                            165/140
2008/0152524 A1 6/2008 Kishi et al.
(Continued)

FOREIGN PATENT DOCUMENTS

CN          1542285 A    11/2004
CN        101218433 A     7/2008
(Continued)

*Primary Examiner* — Bryan M Lettman
(74) *Attorney, Agent, or Firm* — CKC & Partners Co., LLC

(57) ABSTRACT

An oil-injected screw air compressor includes a first stage compression chamber, an air buffering chamber, a second stage compression chamber, an oil cooler, a plurality of sensors, and a controller. The air buffering chamber is coupled to the first stage compression chamber. The second stare compression chamber is coupled to the air buffering chamber. The oil cooler cools the lubricating oil for the first stage compression chamber, the air buffering chamber and the second stage compression chamber. The sensors are respectively located at outlets of the first stage compression chamber, the air buffering chamber and the second stage compression chamber. The controller respectively and dynamically controls flow rates of the lubricating oil entering into the first stare compression chamber, the air buffering chamber and the second stage compression chamber according to temperature and pressure data measured by the sensors.

8 Claims, 1 Drawing Sheet

(52) U.S. Cl.
CPC ...... *F04C 29/026* (2013.01); *F04C 2270/195* (2013.01); *F04C 2270/44* (2013.01); *F04C 2270/46* (2013.01); *F04C 2270/48* (2013.01)

(58) Field of Classification Search
CPC .... F04C 29/021; F04C 29/026; F04C 29/028; F04C 11/001; F04C 11/003; F04C 11/008; F04C 23/001; F04C 23/003; F04C 23/008; F04C 29/0092; F04C 2210/221; F04C 2270/19; F04C 2270/195; F04C 2270/44; F04C 2270/46; F04C 2270/48; F04D 13/12; F04D 13/14; F04D 25/16; F04D 29/06; F04D 29/063
See application file for complete search history.

(56) References Cited

U.S. PATENT DOCUMENTS

| | | | | |
|---|---|---|---|---|
| 2008/0166253 A1* | 7/2008 | Fujimoto | ............... | F04C 18/16 418/201.1 |
| 2008/0279708 A1* | 11/2008 | Heimonen | .......... | F04C 29/0014 418/84 |
| 2009/0252632 A1* | 10/2009 | Daniels | .................. | F04C 18/16 418/84 |

FOREIGN PATENT DOCUMENTS

| | | | |
|---|---|---|---|
| CN | 104676935 A | | 6/2015 |
| EP | 1475586 A2 | | 11/2004 |
| WO | 2007/045052 A1 | | 4/2007 |

\* cited by examiner

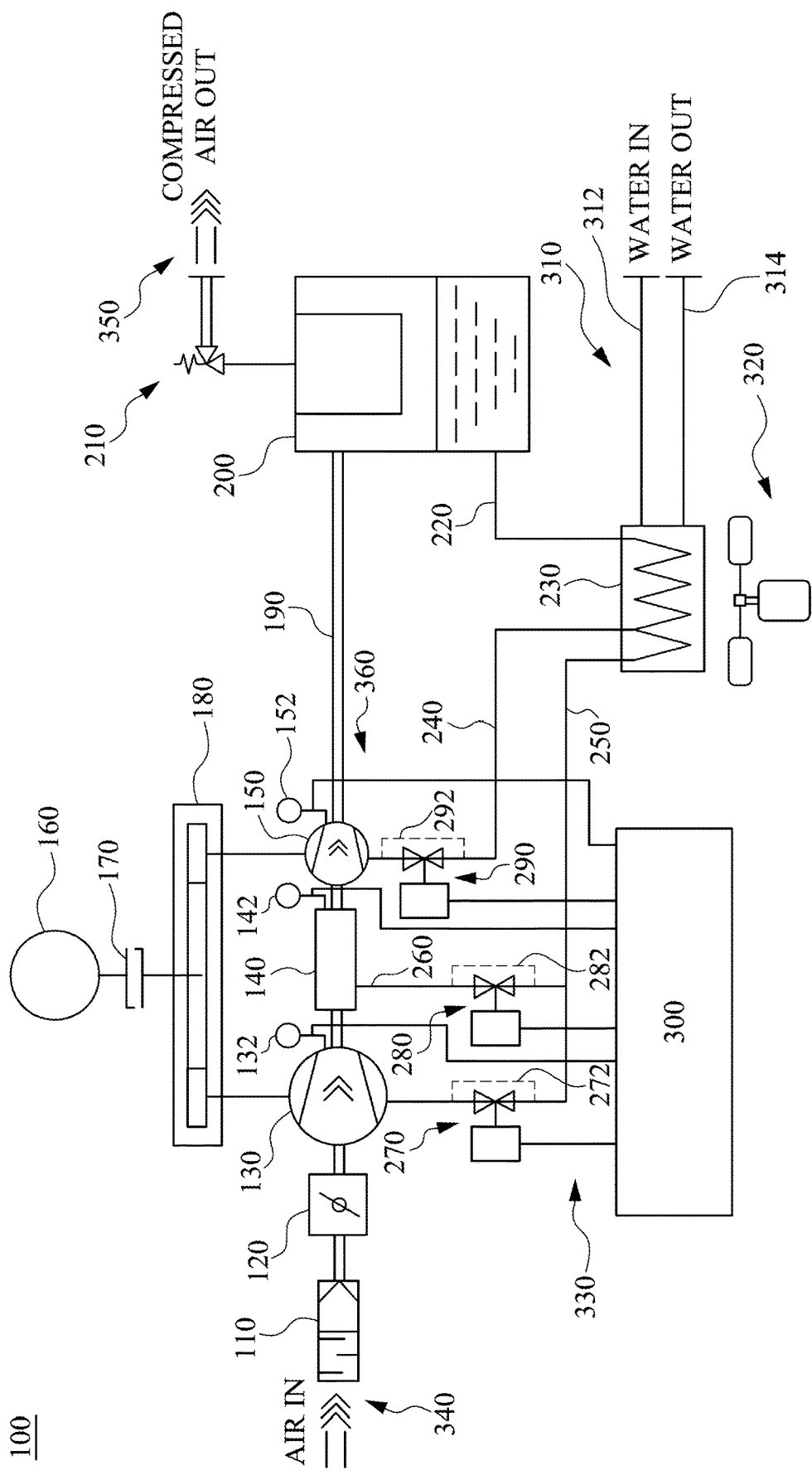

OIL-INJECTED SCREW AIR COMPRESSOR

RELATED APPLICATIONS

This application claims priority to European Patent Application No. 16196232.9, filed Oct. 28, 2016, which is herein incorporated by reference.

TECHNICAL FIELD

The present disclosure generally relates to a screw air compressor. More particularly, the present disclosure relates to an oil-injected screw air compressor.

BACKGROUND

Screw air compressors have been widely used to provide compressed air in industry. The screw air compressor includes two rotors mounted in a working room. Each rotor is provided with helically extending lobes and grooves which are intermeshed to establish compression cavities. In these cavities, a gaseous fluid is displaced and compressed from an inlet channel to an outlet channel by way of the screw compressor.

Each compression cavity during a filling phase communicates with the inlet, during a compression phase undergoes a continued reduction in volume, and during a discharge phase communicates with an outlet. Screw air compressors are often provided with valves for regulating the built-in volume ratio for the capacity of the compressor.

The efficiency of the screw air compressors plays an important role in the energy consumed at the entire factory. For the effective use of the screw air compressors to reduce the energy consumption, there is a need to provide a more efficient, safe, and reliable screw air compressor.

SUMMARY

One objective of the embodiments of the present invention is to provide an oil-injected screw air compressor having a control unit to dynamically control the flow rate of the lubricating oil to maintain the outlet temperature of the compressed air higher than pressure dew point according to the measured temperature, humidity and pressure data.

To achieve these and other advantages and in accordance with the objective of the embodiments of the present invention, as the embodiment broadly describes herein, the embodiments of the present invention provides an oil-injected screw air compressor having a first stage compression chamber, an air buffering chamber coupled to the first stage compression chamber, a second stage compression chamber coupled to the air buffering chamber, an oil cooling device for cooling lubricating oil for the first stage compression chamber, the air buffering chamber and the second stage compression chamber, a plurality sensors respectively located at the first stage compression chamber, the air buffering chamber and the second stage compression chamber, and a control unit respectively and dynamically controlling flow rates of the lubricating oil entering into the first stage compression chamber, the air buffering chamber and the second stage compression chamber according to preset pressure or pressure data and temperature data measured by the sensors and temperature data and humidity data of an environment.

In one embodiment, the oil-injected screw air compressor further has a plurality control valves and a plurality of oil pipes respectively coupled between the oil cooling device and the first stage compression chamber, the oil cooling device and the air buffering chamber, and the oil cooling device and the second stage compression chamber.

In one embodiment, the valves are controlled by the control unit to respectively and dynamically control the flow rates of the lubricating oil entering into the first stage compression chamber, the air buffering chamber and the second stage compression chamber according to the preset pressure or pressure data measured by the sensors and temperature data measured by the sensors and the temperature data and the humidity data of the environment to maintain the outlet temperatures of compressed air of the first stage chamber, the air buffering chamber and the second stage chamber having outlet temperatures higher than pressure dew point temperatures thereof, preferably higher than modified pressure dew point temperatures thereof.

In one embodiment, the oil pipes are connected to the oil cooling device at different positions to allow a temperature of the lubricating oil for the first stage compression chamber and the air buffering chamber is lower than a temperature of the lubricating oil for the second stage compression chamber.

In one embodiment, the valves are a plurality bypass valves able to respectively maintain minimum flow rates of the lubricating oil entering into the first stage compression chamber, the air buffering chamber and the second stage compression chamber.

In one embodiment, the valves further has a plurality bypass pipes able to respectively maintain minimum flow rates of the lubricating oil entering into the first stage compression chamber, the air buffering chamber and the second stage compression chamber.

In one embodiment, the oil cooling device further has a cooling fan for cooling the lubricating oil and is an air-cooling-typed cooling device.

In one embodiment, the oil cooling device further has water pipes for cooling the lubricating oil and is a water-cooling-typed cooling device.

In one embodiment, the oil-injected screw air compressor further has an oil separating tank to separate the lubricating oil from compressed air.

In one embodiment, the oil-injected screw air compressor further has a motor, a transmission device and a gear box to distribute power to the first stage compression chamber and the second stage compression chamber.

In one embodiment, the oil-injected screw air compressor further has a suction filter and a suction throttle valve at an air inlet of the oil-injected screw air compressor.

The oil-injected screw air compressor according to one embodiment of the present invention utilizes sensors to detect the temperature and humidity of the environment and outlet pressures and outlet temperatures of the first stage compression chamber, the air buffering chamber, and the second stage compression chamber to dynamically and respectively control the temperatures of the compressed air so as to prevent water vapor in the compressed air from condensing into liquid water. The flow rates of the lubricating oil of the first stage compression chamber, the air buffering chamber and the second stage compression chamber are dynamically controlled by the control unit according to the feedback ambient temperature and humidity, and pressure data and temperature data from the sensors located at outlets of the first stage compression chamber, the air buffering chamber and the second stage compression chamber. Hence, the oil-injected screw air compressor can be operated close to an isothermal compression condition all the year round, regardless of winter or summer season. The efficiency of the oil-injected screw air compressor is therefore increased.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein:

FIG. 1 illustrates a schismatic diagram showing an oil-injected screw air compressor according to one embodiment of the present invention.

DETAILED DESCRIPTION OF THE PREFERRED EMBODIMENT

The following description is of the best presently contemplated mode of carrying out the present disclosure. This description is not to be taken in a limiting sense but is made merely for the purpose of describing the general principles of the invention. The scope of the invention should be determined by referencing the appended claims.

Referring to FIG. 1, a schismatic diagram showing an oil-injected screw air compressor according to one embodiment of the present invention is illustrated. The oil-injected screw air compressor 100 includes two compression chambers, e.g. a first stage compression chamber 130 and a second stage compression chamber 150, an air buffering chamber 140 coupled to the first stage compression chamber 130 and the second stage compression chamber 150, and an oil separating tank 200 coupled to the second stage compression chamber 150 with an air pipe 190.

The first stage compression chamber 130 and the second stage compression chamber 150 are driven by a motor 160 through a transmission device 170, i.e. a coupling, and a gear box 180 to distribute power to the first stage compression chamber 130 and the second stage compression chamber 150. The oil-injected screw air compressor 100 absorbs air from the air inlet 340 into the first stage compression chamber 130 via a suction filter 110 and a suction throttle valve 120, is then compressed and discharged into the air buffering chamber 140. The air stored in the air buffering chamber 140 is then be absorbed into the second stage compression chamber 150 and compressed and discharged into an oil separating tank 200 through an air pipe 190. The oil accumulated at the bottom of the oil separating tank 200 is delivered into an oil cooling device 230 through a high temperature oil pipe 220. The temperature of the high temperature oil is then cooled down by the oil cooling device 230. The cooled oil is then be delivered into the first stage compression chamber 130 through a first stage lubricating oil pipe 250, the second stage compression chamber 150 through a second stage lubricating oil pipe 240, and the air buffering chamber 140 through an air buffering chamber lubricating oil pipe 260.

The first stage lubricating oil pipe 250, the second stage lubricating oil pipe 240, and the air buffering chamber lubricating oil pipe 260 can absorb the cooling oil, i.e. the lubricating oil, from different positions of the oil cooling device 230. For example, the first stage lubricating oil pipe 250 absorbs the lubricating oil for the first stage compression chamber 130 at a lower temperature position and the second stage lubricating oil pipe 240 absorbs the lubricating oil for the second stage compression chamber 150 at a higher temperature position. The air buffering chamber lubricating oil pipe 260 can absorb the lubricating oil from the oil cooling device 230 at the position similar to the first stage lubricating oil pipe 250.

In addition, a control valve 270 is equipped in the first stage lubricating oil pipe 250 and controlled by a control unit 300, a control valve 280 is equipped in the air buffering chamber lubricating oil pipe 260 and controlled by the control unit 300, and a control valve 290 is equipped in the second stage lubricating oil pipe 240 and also controlled by the control unit 300. The control unit 300 separately determines the flow rate of the oil entering into the first stage compression chamber 130, the second stage compression chamber 150, and the air buffering chamber 140 according to atmospheric temperature and humidity of the environment and the outlet pressures and outlet temperatures of the first stage compression chamber 130, the second stage compression chamber 150, and the air buffering chamber 140. Therefore, the flow rate of the cooling oil, i.e. lubricating oil, is decreased while the temperature at the outlet of the first stage compression chamber 130, the second stage compression chamber 150, or the air buffering chamber 140 is too low, e.g. lower than a modified pressure dew point temperature thereof. For example, the modified pressure dew point temperature is the pressure dew point temperature plus 6 to 10 degrees Celsius. The flow rate of the cooling oil is increased while the temperature at the outlet of the first stage compression chamber 130, the second stage compression chamber 150 or the air buffering chamber 140 is too high, e.g. higher than the modified pressure dew point temperature thereof.

In one embodiment, the temperature at the outlet of the first stage compression chamber 130 is controlled at about 8 degrees Celsius higher than first stage pressure dew point e.g. 70 degrees Celsius, the temperature at the outlet of the second stage compression chamber 150 is controlled at about 10 degrees Celsius higher than second pressure dew point e.g. 90 degrees Celsius, and the temperature at the outlet of air buffering chamber 140 is controlled at about 6 degrees Celsius higher than first stage pressure dew point e.g. 68 degrees Celsius because that the pressure of the outlet of the second stage compression chamber 150 is higher than those of the first stage compression chamber 130 and the air buffering chamber 140. The control unit 300 separately and dynamically controls the control valve 270, the control valve 280 and the control valve 290 to control the flow rate of the cooling oil according to the temperature and the humidity of the environment, and the outlet pressures and outlet temperatures of the first stage compression chamber 130, the second stage compression chamber 150, and the air buffering chamber 140 with sensors 132 located at the outlet of the first stage compression chamber 130, sensors 152 located at the outlet of the second stage compression chamber 150 and sensors 142 located at the outlet of the air buffering chamber 140 to maintain the output temperatures of the compressed air higher than a pressure dew point temperature, preferably a modified pressure dew point temperature, e.g. the pressure dew point temperature plus 6 to 10 degrees Celsius, at the outlets thereof. Therefore, the control unit 300 can automatically and individually controls the flow rate of the cooling oil by way of the control valve 270, the control valve 280 and the control valve 290 through control circuits 330. The measured temperature and pressure data are transmitted to the control unit 300 through circuits 360. In addition, the temperature and humidity data of the environment can also be detected by the control unit 300 or be sent to the control unit 300 by other equipment.

In one embodiment, the control valve 270, the control valve 280 and the control valve 290 further include a bypass pipe 272, a bypass pipe 282 and a bypass pipe 292, or the control valve 270, the control valve 280 and the control valve 290 further include bypass function therein to respectively maintain a minimum flow rate of the cooling oil for the first stage compression chamber 130, the second stage compression chamber 150, and the air buffering chamber 140.

In one embodiment, the oil cooling device 230 includes a cooling water pipe 310 to provide the cooling water for cooling the high temperature oil. The cooling water pipe 310 further includes a water inlet pipe 312 and a water outlet pipe 314 to supply and drain the cooling water.

In one embodiment, the oil cooling device 230 includes a cooling fan 320 for cooling the high temperature oil.

In one embodiment, the oil cooling device 230 includes the cooling fan 320 and the cooling water pipe 310 for cooling the high temperature oil, i.e. lubricating oil.

In one embodiment, a pressure valve 210, e.g. a pressure maintenance valve, is equipped in the oil separating tank 200 to maintain the compressed air pressure for the oil-injected screw air compressor 100 and supply the compressed air to the required equipment through an air outlet 350.

The oil-injected screw air compressor according to one embodiment of the present invention utilizes the sensors to detect the outlet pressures and outlet temperatures of the first stage compression chamber, the air buffering chamber, the second stage compression chamber and the temperature and humidity of the environment to automatically control the temperatures of the compressed air to prevent the water vapor in the compressed air from condensing into the liquid water. The flow rates of the lubricating oil of the first stage compression chamber, the air buffering chamber and the second stage compression chamber are dynamically controlled by the control unit according to the feedback measured data. Therefore, the oil-injected screw air compressor can be operated close to an isothermal compression condition all the year round, regardless of winter or summer season. The efficiency of the oil-injected screw air compressor is therefore increased.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. An oil-injected screw air compressor, comprising:
a first stage compression chamber;
an air buffering chamber coupled to the first stage compression chamber;
a second stage compression chamber coupled to the air buffering chamber;
an oil separating tank connected to the second stage compression chamber with an air pine to separate lubricating oil from compressed air of the second stage compression chamber;
a plurality of control valves and a plurality of oil pipes;
an oil cooler connected to the oil separating tank with one of the plurality of oil pipes to cool the lubricating oil for the first stage compression chamber, the air buffering chamber and the second stage compression chamber;
a plurality of sensors respectively located at outlets of the first stage compression chamber, the air buffering chamber and the second stage compression chamber; and
a controller respectively and dynamically controlling flow rates of the lubricating oil entering into the first stage compression chamber, the air buffering chamber and the second stage compression chamber according to outlet pressure and outlet temperature data measured by the sensors, and temperature data and humidity data of an environment, wherein the plurality of oil pipes further comprise a first stage lubricating oil pipe, an air buffering chamber lubricating oil pipe, and a second stage lubricating oil pipe;
the plurality of control valves comprise a first control valve, a second control valve, and a third control valve;
the oil cooler is connected directly to the first stage compression chamber via the first stage lubricating oil pipe and the first control valve;
the oil cooler is connected directly to the air buffering chamber via the first stage lubricating oil pipe, the air buffering chamber lubricating oil pipe, and the second control valve; and
the oil cooler is connected directly to the second stage compression chamber via the second stage lubricating oil pipe and the third control valve.

2. The oil-injected screw air compressor of claim 1, wherein the valves are controlled by the controller to respectively and dynamically control the flow rates of the lubricating oil entering into the first stage compression chamber, the air buffering chamber and the second stage compression chamber according to the outlet pressure and outlet temperature data measured by the sensors and the temperature data and the humidity data of the environment to maintain the outlet temperatures of compressed air of the first stage compression chamber, the air buffering chamber and the second stage compression chamber higher than pressure dew point temperatures thereof.

3. The oil-injected screw air compressor of claim 2, wherein the oil pipes are connected to the oil cooler at different positions to allow a temperature of the lubricating oil for the first stage compression chamber and the air buffering chamber to be lower than a temperature of the lubricating oil for the second stage compression chamber.

4. The oil-injected screw air compressor of claim 2, wherein the valves are a plurality of bypass valves to respectively maintain minimum flow rates of the lubricating oil entering into the first stage compression chamber, the air buffering chamber and the second stage compression chamber.

5. The oil-injected screw air compressor of claim 2, further comprising a plurality of bypass pipes to respectively maintain minimum flow rates of the lubricating oil entering into the first stage compression chamber, the air buffering chamber and the second stage compression chamber.

6. The oil-injected screw air compressor of claim 1, wherein the oil cooler further comprises a cooling fan for cooling the lubricating oil.

7. The oil-injected screw air compressor of claim 1, wherein the oil cooler further comprises water pipes for cooling the lubricating oil.

8. The oil-injected screw air compressor of claim 1, further comprising a motor, a transmission and a gear box to distribute power to the first stage compression chamber and the second stage compression chamber, and a suction filter and a suction throttle valve at an air inlet of the oil-injected screw air compressor.

\* \* \* \* \*